(12) United States Patent
Chen et al.

(10) Patent No.: US 11,094,268 B1
(45) Date of Patent: Aug. 17, 2021

(54) LOCAL DIMMING METHOD AND DISPLAY DEVICE

(71) Applicant: HIMAX TECHNOLOGIES LIMITED, Tainan (TW)

(72) Inventors: Wu-Feng Chen, Tainan (TW); Hsueh-Tsung Lu, Tainan (TW); Tsai-Hsing Chen, Tainan (TW); Cheng-Che Tsai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/992,045

(22) Filed: Aug. 12, 2020

(51) Int. Cl.
| | | |
|---|---|---|
| *G09G 3/36* | (2006.01) | |
| *G09G 3/34* | (2006.01) | |
| *G09G 3/20* | (2006.01) | |
| *G02F 1/13357* | (2006.01) | |

(52) U.S. Cl.
CPC ..... *G09G 3/3406* (2013.01); *G02F 1/133603* (2013.01); *G02F 1/133611* (2013.01); *G09G 3/2007* (2013.01); *G09G 2320/0626* (2013.01)

(58) Field of Classification Search
CPC .. G09G 3/36; G09G 3/34; G09G 3/32; G09G 3/30; G09G 5/00; G06F 3/038
See application file for complete search history.

(56) References Cited

U.S. PATENT DOCUMENTS

| | | | | |
|---|---|---|---|---|
| 2011/0216084 | A1* | 9/2011 | Mori | H04N 21/4318 345/589 |
| 2015/0356905 | A1* | 12/2015 | Watanabe | G09G 5/003 345/88 |
| 2016/0309112 | A1 | 10/2016 | Tsai et al. | |
| 2018/0075813 | A1 | 3/2018 | Zhang et al. | |
| 2019/0064559 | A1* | 2/2019 | Harada | G09G 3/3677 |
| 2020/0027408 | A1 | 1/2020 | Xi et al. | |
| 2020/0111428 | A1* | 4/2020 | Sohn | G09G 3/3426 |
| 2020/0118525 | A1* | 4/2020 | Choi | G09G 3/3426 |

FOREIGN PATENT DOCUMENTS

TW 201930975 A 8/2019

* cited by examiner

*Primary Examiner* — Pegeman Karimi
(74) *Attorney, Agent, or Firm* — CKC & Partners Co., LLC

(57) ABSTRACT

The local dimming method includes: dividing a digital image into multiple blocks and calculating a backlight parameter of each of the blocks; performing a backlight simulation based on the backlight parameters to calculate source brightness of each pixel; quantifying the backlight parameters into multiple reference backlight parameters according to numerical ranges; performing the backlight simulation based on the reference backlight parameters to calculate reference source brightness of each pixel; for each of the pixels, setting a gain of the pixel to be less than or equal to a first value if the corresponding reference source brightness is equal to the darkest backlight parameter, otherwise determining the gain of the pixel according to a ratio of the source brightness to the reference source brightness; adjusting grey levels of the pixels according to the gains to obtain adjusted grey levels and driving the display panel according to the adjusted grey levels.

10 Claims, 4 Drawing Sheets

LOCAL DIMMING METHOD AND DISPLAY DEVICE

BACKGROUND

Field of Invention

The present disclosure relates to a local dimming method for determining gains of pixels dynamically.

Description of Related Art

With the development of image display technology, consumers have higher and higher need for image quality, so the local dimming technology has been developed, that is, a frame is divided into multiple blocks, and backlight brightness is determined according to content of each block to increase the contrast. In some conventional approaches, grey levels (including red, blue and green) of a pixel are increased according to a gain when the backlight brightness of the corresponding block is decreased. In this case, noises of the pixel may be amplified and cause color shift. For example, the grey levels of red, blue and green should be equal or close to each other when a black background is rendered. If the green grey level has a positive noise, the noise will be amplified according to the gain to cause green color shift. In addition, the grey levels may be overcompensated (i.e. saturated) in some situations.

SUMMARY

Embodiments of the present disclosure provide a local dimming method for a display device including a display panel and a backlight module including multiple lighting units. The local dimming method includes: dividing a digital image into multiple blocks and calculating a backlight parameter of each of the blocks, in which the digital image includes multiple pixels, the backlight parameters correspond to the lighting units respectively for adjusting brightness of the corresponding lighting unit; performing a backlight simulation based on the backlight parameters to calculate source brightness of each of the pixels; quantifying the backlight parameters into multiple reference backlight parameters according to multiple numerical ranges, in which the reference backlight parameters include a darkest backlight parameter; performing the backlight simulation based on the reference backlight parameters to calculate reference source brightness of each of the pixels; for each of the pixels, setting a gain of the pixel to be less than or equal to a first value if the corresponding reference source brightness is equal to the darkest backlight parameter, otherwise determining the gain of the pixel according to a ratio of the corresponding source brightness to the corresponding reference source brightness; and for each of the pixels, adjusting a grey level of the pixel according to the corresponding gain to obtain an adjusted grey level, and driving the display panel according to the adjusted grey level.

In some embodiments, each of the lighting units includes at least one light emitting diode, each of the backlight parameters includes a duty cycle of the corresponding light emitting diode. The local dimming method further includes: driving the backlight module according to the backlight parameters.

In some embodiments, the first value is equal to 1.

In some embodiments, the number of the numerical ranges is equal to 2. The step of quantifying the backlight parameters into the reference backlight parameters according to the numerical ranges including: for each of the backlight parameters, binarizing the backlight parameter into a brightest backlight parameter if the backlight parameter is greater than a threshold, otherwise binarizing the backlight parameter into the darkest backlight parameter.

In some embodiments, the process of determining the gain of the pixel according to the ratio of the corresponding source brightness to the corresponding reference source brightness is performed according to a following equation (1):

$$G = (R)^{(-1/\gamma)} \qquad (1)$$

G is the gain, $\gamma$ is a real number, and R is the ratio of the source brightness to the reference source brightness.

From another aspect, embodiments of the present disclosure provide a display device including a backlight module, a display panel and a circuit. The backlight module includes multiple lighting units. The circuit is configured to perform multiple steps of: dividing a digital image into multiple blocks and calculating a backlight parameter of each of the blocks, in which the digital image includes multiple pixels, the backlight parameters correspond to the lighting units respectively for adjusting brightness of the corresponding lighting unit; performing a backlight simulation based on the backlight parameters to calculate source brightness of each of the pixels; quantifying the backlight parameters into multiple reference backlight parameters according to multiple numerical ranges, in which the reference backlight parameters include a darkest backlight parameter; performing the backlight simulation based on the reference backlight parameters to calculate reference source brightness of each of the pixels; for each of the pixels, setting a gain of the pixel to be less than or equal to a first value if the corresponding reference source brightness is equal to the darkest backlight parameter, otherwise determining the gain of the pixel according to a ratio of the corresponding source brightness to the corresponding reference source brightness; for each of the pixels, adjusting a grey level of the pixel according to the corresponding gain to obtain an adjusted grey level; and driving the display panel according to the adjusted grey level.

BRIEF DESCRIPTION OF THE DRAWINGS

The disclosure can be more fully understood by reading the following detailed description of the embodiment, with reference made to the accompanying drawings as follows.

DETAILED DESCRIPTION

Specific embodiments of the present disclosure are further described in detail below with reference to the accompanying drawings, however, the embodiments described are not intended to limit the present disclosure and it is not intended for the description of operation to limit the order of implementation. Moreover, any device with equivalent functions that is produced from a structure formed by a recombination of elements shall fall within the scope of the present disclosure. Additionally, the drawings are only illustrative and are not drawn to actual size.

The using of "first", "second", "third", etc. in the specification should be understood for identifying units or data described by the same terminology, but are not referred to particular order or sequence.

Figure 1:
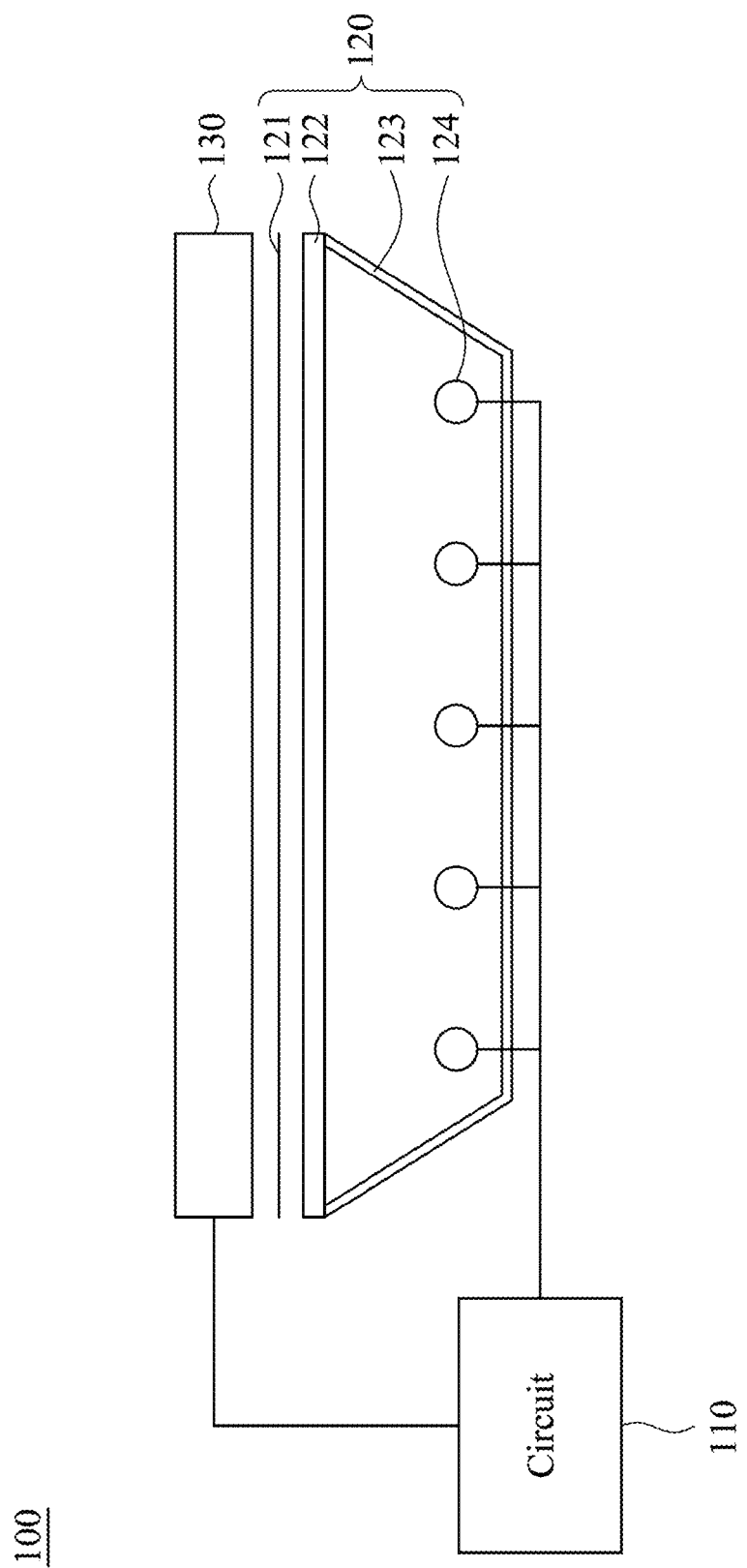
FIG. 1 is a schematic diagram of a display device in accordance with an embodiment.

FIG. 1 is a schematic diagram of a display device in accordance with an embodiment. Referring to FIG. 1, a display device 100 may be a TV, a computer screen, or any electric device with a screen. The display device 100 includes a circuit 110, a backlight module 120, and a display panel 130. The circuit 110 may be a microprocessor, a microcontroller, an image processing circuit, an application specific integrated circuit, etc. In some embodiments, the circuit 110 is a time controller. The backlight module 120 includes an optical film 121, a diffuser plate 122, a reflector 123, and light emitting diodes 124, in which the optical film 121 may be a light guide, a polarizer or any other film. The display panel 130 is a liquid crystal panel such as a fringe field switching (FFS) panel, an in-plane switching (IPS) panel, a twisted nematic (TN) panel and a vertical alignment (VA) panel which is not limited in the disclosure.

The circuit 110 is configured to receive a digital image and perform a local dimming method according to the digital image to control the light emitting diodes 124. In particular, when the content of the image is dark, gains of the corresponding pixels are set to be less or equal to a value. Therefore, noises of the pixels are not amplified. Embodiments are provided below to describe the local dimming method.

Figure 2:
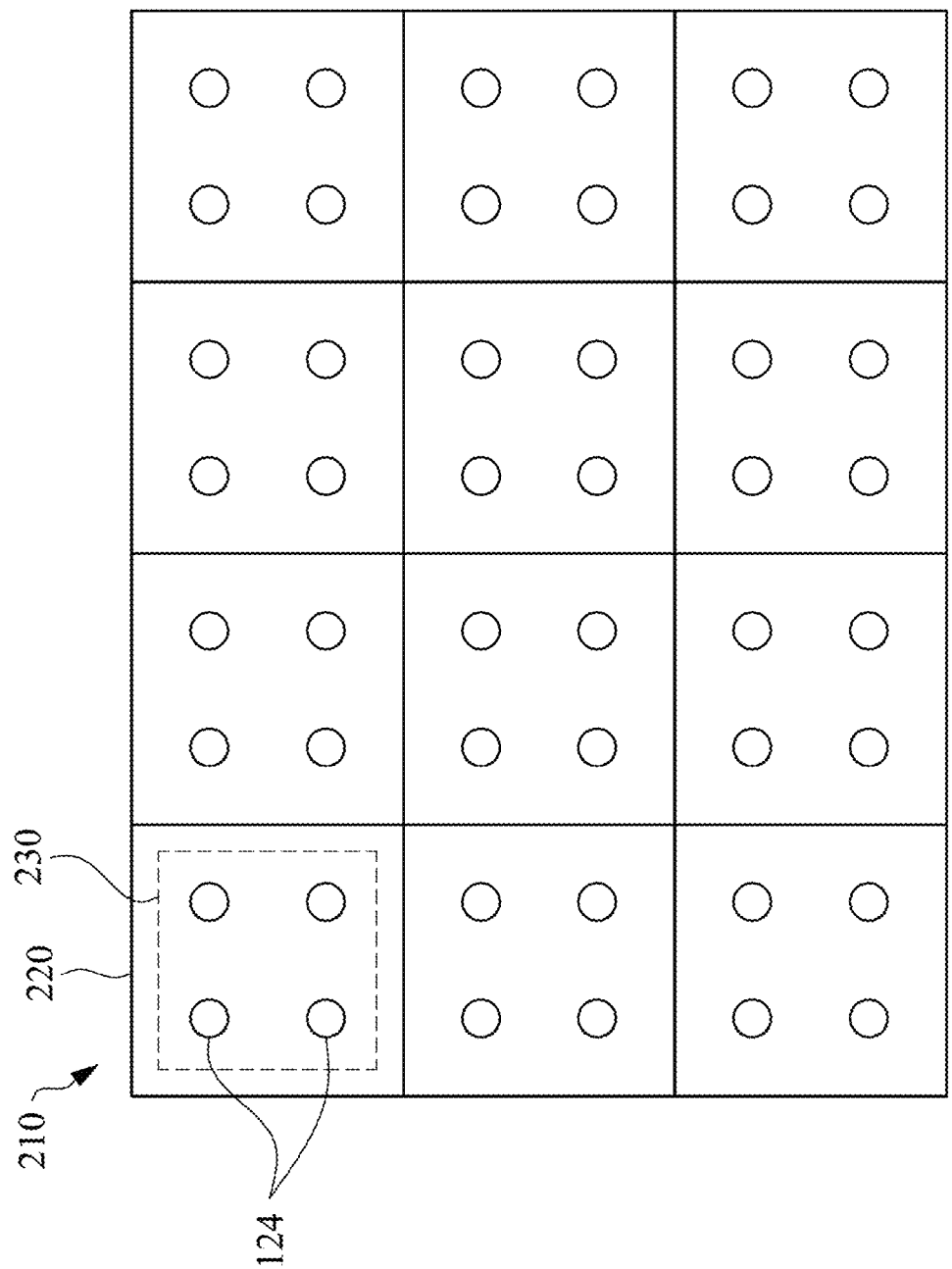
FIG. 2 is a schematic diagram of dividing a digital image into blocks in accordance with an embodiment.

FIG. 2 is a schematic diagram of dividing a digital image into blocks in accordance with an embodiment. Referring to FIG. 2, a digital image 210 is obtained. The digital image 210 includes multiple pixels and each pixel includes grey levels such as red, green, and blue grey levels. The digital image 210 is divided into multiple blocks 220. Each of the blocks 220 corresponds to a lighting unit 230 including one or more light emitting diodes (LED) 124. Note that FIG. 2 is merely an example, and the number and the arrangements of the blocks 220 and the number of the LED 124 are not limited in the disclosure. In some embodiments, the LEDs 124 may be mini LEDs or micro LEDs.

Figure 3:
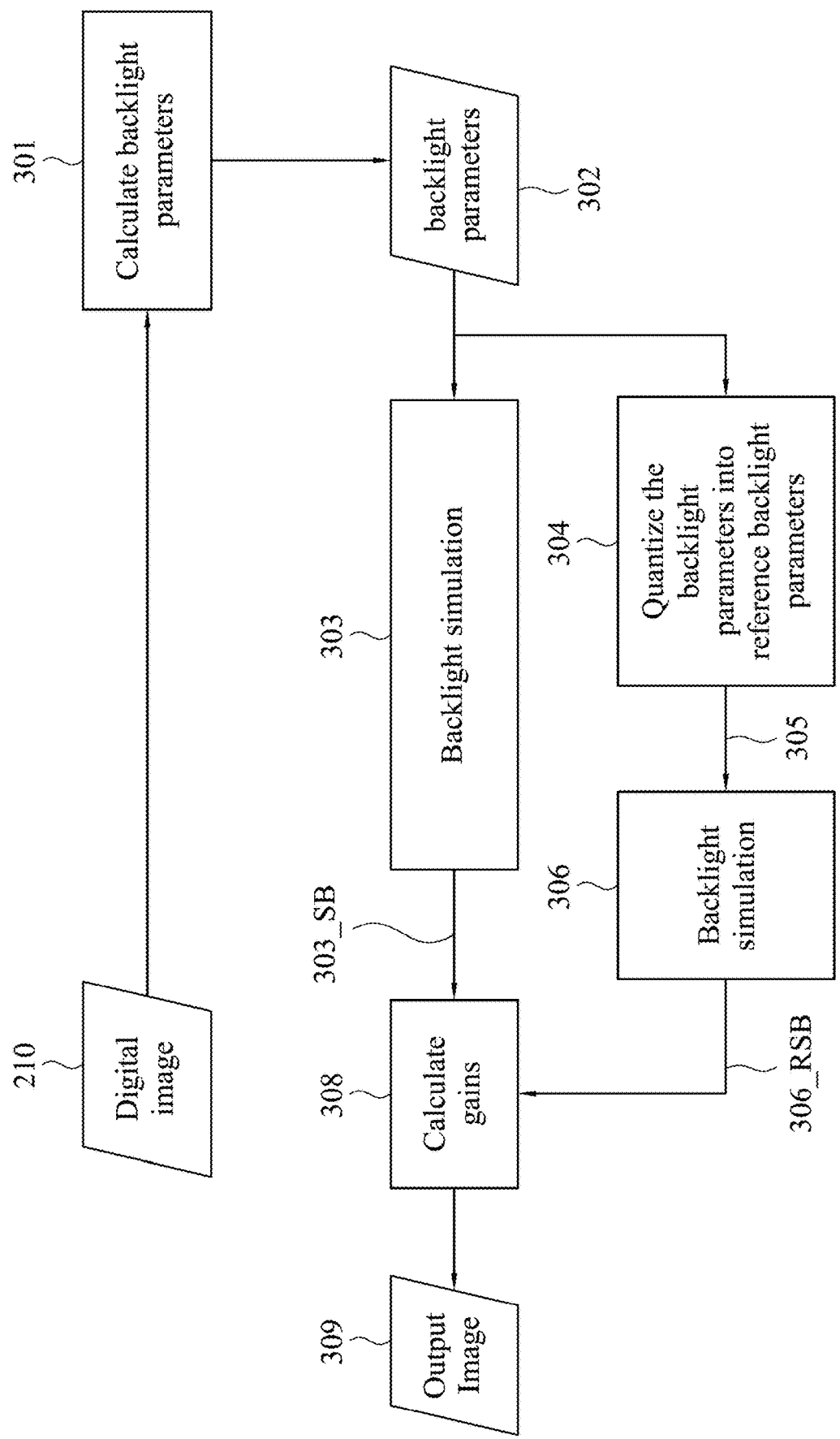
FIG. 3 is a schematic flowchart of a local dimming method in accordance with an embodiment.

FIG. 3 is a schematic flowchart of a local dimming method in accordance with an embodiment. Referring to FIG. 2 and FIG. 3, in step 301, a backlight parameter 302 is calculated according to the pixels in one block for each of the blocks. Each backlight parameter 302 is used to adjust brightness of the corresponding lighting unit. For example, the backlight parameter 302 includes a duty cycle of each light emitting diode 124 in which 100% corresponds to the maximum brightness and 0% corresponds to the lowest brightness. In general, the calculated duty cycle is large when the pixels in the corresponding block are bright; and the calculated duty cycle is small when the pixels are dark. For example, a maximum value of the red, green, and blue grey levels of each pixel is first calculated as pixel brightness. An average and top decile of the pixel brightness in one block are calculated, and these two values are multiplied by respective weights and then are summed up. The duty cycle is calculated according to the sum (e.g. by a linear or nonlinear increasing function). However, the aforementioned approach is merely an example, and any suitable algorithm may be applied to calculate the duty cycle. In the embodiment, the duty cycle is recorded by 12 bits, and thus the value of the duty cycle is in a range from 0 to 4095.

In some embodiments, the backlight parameter 302 may include a voltage value for controlling the magnitude of the current flowing through the corresponding LED so as to adjust the brightness of the LED. In some embodiments, the backlight parameter 302 may be the number of the LEDs which are turned on in one lighting unit to control the brightness.

There are two paths in the following procedure. In the first path (i.e. step 303), a backlight simulation is performed based on the backlight parameters 302 to calculate source brightness 303_SB of every pixel (or sub-pixels in some embodiments). The backlight simulation is based on a model of the display device 100 that may be obtained through experiments or any approaches.

Figure 4:
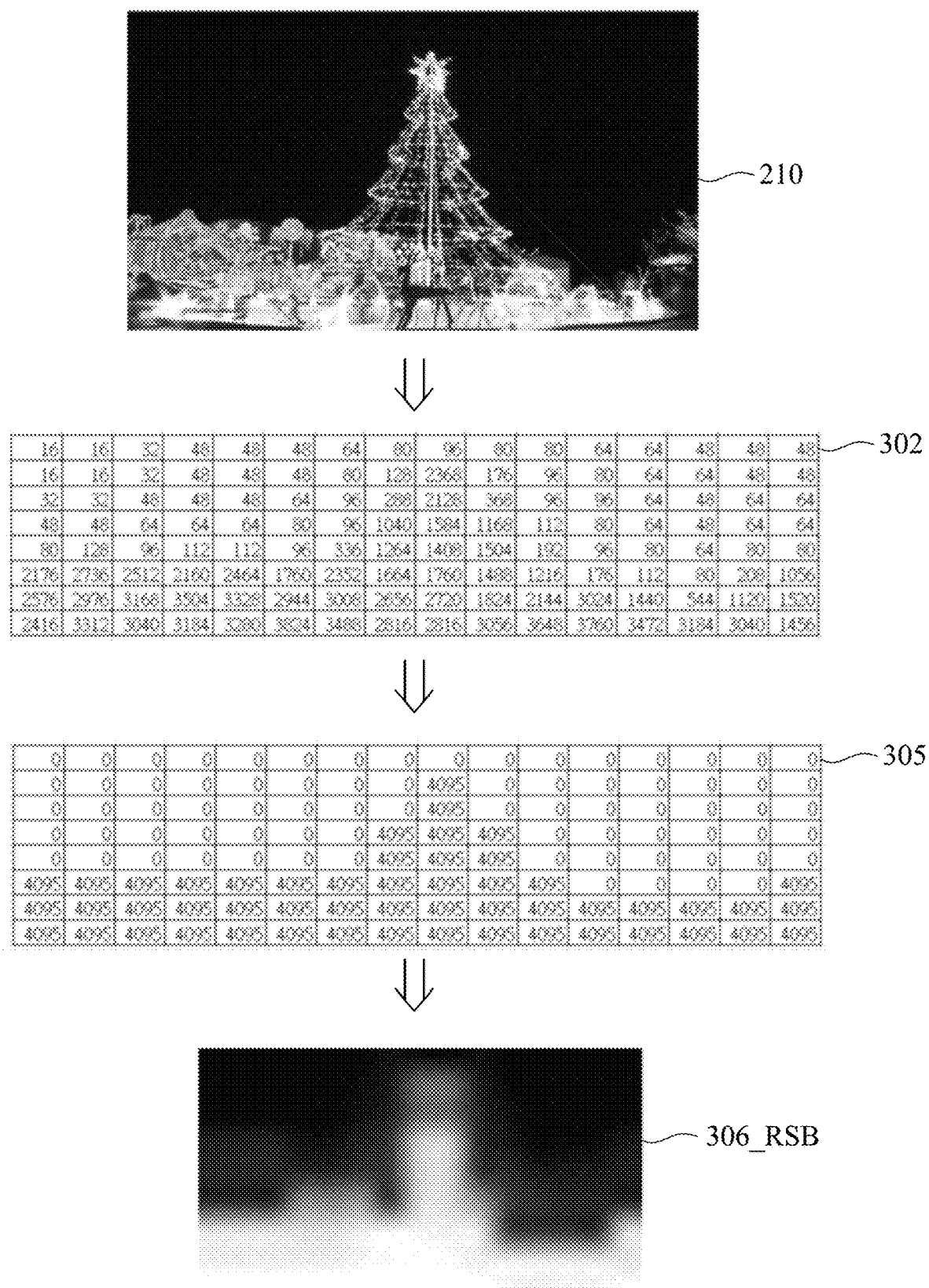
FIG. 4 is a schematic diagram of generating reference source brightness in accordance with an embodiment.

In the second path (i.e. step 304), the backlight parameters 302 are quantized into reference backlight parameters 305 according to multiple numerical ranges. In some embodiments, the number of the numerical ranges is 2, and then the quantization is identical to binarization. These two numerical ranges are, for example, [0,384) and [384,4095]. That is, if the backlight parameter is greater than or equal to a threshold (e.g. 384), then the backlight parameter is binarized into 4095 (also referred to a brightest backlight parameter), otherwise the backlight parameter is binarized into 0 (also referred to a darkest backlight parameter). FIG. 4 is a schematic diagram of generating reference source brightness in accordance with an embodiment. In the example of FIG. 4, the backlight parameters 302 of the blocks are calculated according to the digital image 210. The backlight parameters 302 are quantized into the reference backlight parameters 305. Note that dark regions correspond to the values of "0", and the other regions correspond to the values of "4095".

Referring to FIG. 3 and FIG. 4, in step 306, the backlight simulation is performed based on the reference backlight parameters 305 to calculate reference source brightness 306_RSB of each pixel (or sub-pixels in some embodiments). Although the light source is diffused, there is a lot of reference source brightness 306_RSB which value is equal to 0.

In step 308, a gain of each pixel is calculated. In particular, when the reference source brightness 306_RSB of the pixel is equal to the darkest backlight parameter (i.e. 0), the gain is set to be less than or equal to a first value (e.g. 1) because the pixels are in a black background where the noises will be amplified and cause color shift if the gain is greater than 1. In some embodiments, the first value may be 0.9, 1.1, 1.2, 1.3 or any suitable number. In some embodiments, when the reference source brightness 306_RSB is equal to the darkest backlight parameter, the gain is set to be 1. On the other hand, if the reference source brightness 306_RSB is not equal to the darkest backlight parameter, the gain is calculated according to a ratio of the corresponding source brightness 303_SB to the reference source brightness 306_RSB as written in the following equation (1).

$$G = (R)^{(-1/\gamma)} \quad (1)$$

In the equation (1), G is the gain. $\gamma$ is a real number such as 2.2. R is the ratio of the source brightness to the reference source brightness that may be written as R=a/b where a is the source brightness 303_SB and b is the reference source brightness 306_RSB. When the reference source brightness 306_RSB is equal to the brightest backlight parameter (i.e. 4095), the ratio R represents the brightness percentage of the maximum brightness and in that case, the corresponding grey levels have to be increased for compensation. The change of the grey levels has to be substituted into a gamma curve to obtain the change of the real brightness, and thus the ratio R is substituted into the inverse function of the gamma curve. In addition, the value of "−1" in the equation (1) represents that the adjustment of the grey levels is inversely proportional to the adjustment of the backlight brightness.

The aforementioned two numerical ranges are [0,384) and [384,4095] in the embodiment, but more numerical ranges are possible in other embodiments. For example, the numerical ranges may include [0,384), [384, 2048) and [2048, 4095] that correspond to three reference backlight parameters of 0, 2048, and 4095 respectively. The number of the numerical ranges is not limited in the disclosure.

After the gains of the pixels are calculated, the grey levels are adjusted according to the corresponding gains to obtain an output image 309. In some embodiments, the gain of each grey level is calculated separately. Then the display panel 130 is driven according to the adjusted grey levels (i.e. the output image 309), and the backlight module 120 is driven according to the backlight parameters 302. For example, the circuit 110 turns on the LEDs of one lighting unit according to the corresponding backlight parameter 302. The circuit 110 also transmits the adjusted grey levels to a source driver which generates voltages on data lines accordingly. People in the art should be able to appreciate how the display panel is driven according to the grey levels, and thus it will not be described in detail herein.

In the aforementioned local dimming method, the gains of the pixels in a dark region are determined dynamically to prevent the noises of the dark region from being amplified. In addition, overcompensation of the pixels is also avoided.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A local dimming method for a display device comprising a display panel and a backlight module comprising a plurality of lighting units, the local dimming method comprising:
dividing a digital image into a plurality of blocks and calculating a backlight parameter of each of the blocks, wherein the digital image comprises a plurality of pixels, the backlight parameters correspond to the lighting units respectively for adjusting brightness of the corresponding lighting unit;
performing a backlight simulation based on the backlight parameters to calculate source brightness of each of the pixels;
quantifying the backlight parameters into a plurality of reference backlight parameters according to a plurality of numerical ranges, wherein the reference backlight parameters comprise a darkest backlight parameter;
performing the backlight simulation based on the reference backlight parameters to calculate reference source brightness of each of the pixels;
for each of the pixels, setting a gain of the pixel to be less than or equal to a first value if the corresponding reference source brightness is equal to the darkest backlight parameter, otherwise determining the gain of the pixel according to a ratio of the corresponding source brightness to the corresponding reference source brightness;
for each of the pixels, adjusting a grey level of the pixel according to the corresponding gain to obtain an adjusted grey level; and
driving the display panel according to the adjusted grey level.

2. The local dimming method of claim 1, wherein each of the lighting units comprises at least one light emitting diode, each of the backlight parameters comprises a duty cycle of the corresponding light emitting diode, and the local dimming method further comprises:
driving the backlight module according to the backlight parameters.

3. The local dimming method of claim 1, wherein the first value is equal to 1.

4. The local dimming method of claim 1, wherein a number of the numerical ranges is equal to 2, and the step of quantifying the backlight parameters into the reference backlight parameters according to the numerical ranges comprising:
for each of the backlight parameters, binarizing the backlight parameter into a brightest backlight parameter if the backlight parameter is greater than a threshold, otherwise binarizing the backlight parameter into the darkest backlight parameter.

5. The local dimming method of claim 1, wherein determining the gain of the pixel according to the ratio of the corresponding source brightness to the corresponding reference source brightness is performed according to a following equation (1):

$$G=(R)^{(-1/\gamma)} \quad (1)$$

wherein G is the gain, γ is a real number, and R is the ratio of the source brightness to the reference source brightness.

6. A display device comprising:
a backlight module comprising a plurality of lighting units;
a display panel; and
a circuit configured to perform a plurality of steps of:
dividing a digital image into a plurality of blocks and calculating a backlight parameter of each of the blocks, wherein the digital image comprises a plurality of pixels, the backlight parameters correspond to the lighting units respectively for adjusting brightness of the corresponding lighting unit;
performing a backlight simulation based on the backlight parameters to calculate source brightness of each of the pixels;
quantifying the backlight parameters into a plurality of reference backlight parameters according to a plurality of numerical ranges, wherein the reference backlight parameters comprise a darkest backlight parameter;
performing the backlight simulation based on the reference backlight parameters to calculate reference source brightness of each of the pixels;
for each of the pixels, setting a gain of the pixel to be less than or equal to a first value if the corresponding reference source brightness is equal to the darkest backlight parameter, otherwise determining the gain of the pixel according to a ratio of the corresponding source brightness to the corresponding reference source brightness;

for each of the pixels, adjusting a grey level of the pixel according to the corresponding gain to obtain an adjusted grey level; and driving the display panel according to the adjusted grey level.

7. The display device of claim 6, wherein each of the lighting units comprises at least one light emitting diode, each of the backlight parameters comprises a duty cycle of the corresponding light emitting diode, and the circuit is further configured to drive the backlight module according to the backlight parameter.

8. The display device of claim 6, wherein the first value is equal to 1.

9. The display device of claim 6, wherein a number of the numerical ranges is equal to 2 and the circuit is further configured to:

for each of the backlight parameters, binarize the backlight parameter into a brightest backlight parameter if the backlight parameter is greater than a threshold, otherwise binarize the backlight parameter into the darkest backlight parameter.

10. The display device of claim 6, wherein determining the gain of the pixel according to the ratio of the corresponding source brightness to the corresponding reference source brightness is performed according to a following equation (1):

$$G=(R)^{(-1/\gamma)} \tag{1}$$

wherein G is the gain, $\gamma$ is a real number, and R is the ratio of the source brightness to the reference source brightness.

\* \* \* \* \*